US010506532B2

(12) United States Patent
Seo et al.

(10) Patent No.: US 10,506,532 B2
(45) Date of Patent: Dec. 10, 2019

(54) METHOD FOR PERFORMING DEVICE TO DEVICE COMMUNICATION IN WIRELESS COMMUNICATION SYSTEM AND DEVICE PERFORMING SAME

(71) Applicant: LG ELECTRONICS INC., Seoul (KR)

(72) Inventors: Inkwon Seo, Seoul (KR); Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 268 days.

(21) Appl. No.: 15/521,743

(22) PCT Filed: Dec. 3, 2015

(86) PCT No.: PCT/KR2015/013075
§ 371 (c)(1),
(2) Date: Apr. 25, 2017

(87) PCT Pub. No.: WO2016/093547
PCT Pub. Date: Jun. 16, 2016

(65) Prior Publication Data
US 2017/0245229 A1 Aug. 24, 2017

Related U.S. Application Data

(60) Provisional application No. 62/089,212, filed on Dec. 8, 2014.

(51) Int. Cl.
H04W 56/00 (2009.01)
H04W 76/10 (2018.01)
(Continued)

(52) U.S. Cl.
CPC ......... *H04W 56/001* (2013.01); *H04W 8/005* (2013.01); *H04W 24/04* (2013.01);
(Continued)

(58) Field of Classification Search
None
See application file for complete search history.

(56) References Cited

U.S. PATENT DOCUMENTS

2014/0307611 A1 10/2014 Tesanovic et al.
2015/0119056 A1* 4/2015 Lee ..................... H04W 72/042
455/450
2016/0227496 A1* 8/2016 Panteleev ............ H04W 76/18

FOREIGN PATENT DOCUMENTS

CN 103108405 A 5/2013
CN 103582077 A 2/2014
(Continued)

OTHER PUBLICATIONS

Huawei "D2D Synchronization Procedure for Out-of-Coverage" 3GPP TSG RAN WG1 Meeting #77 May 2014 (Year: 2014).*
(Continued)

Primary Examiner — Jamaal Henson
(74) Attorney, Agent, or Firm — Birch, Stewart, Kolasch & Birch, LLP

(57) ABSTRACT

A method for transmitting a device to device (D2D) broadcasting channel by a D2D terminal supporting a D2D operation according to an embodiment of the present invention comprises the steps of: decoding a first D2D resource area where a first D2D synchronization signal and a first D2D broadcasting channel are transmitted from a synchronization reference source of the D2D terminal; and according to the result of the decoding, transmitting a second D2D synchronization signal and a second D2D broadcasting channel of the D2D terminal in a second D2D resource, wherein, when acquisition of system information included in the first D2D broadcasting channel through the decoding is unsuccessful, the second D2D broadcasting channel is configured using system information acquired from a previous D2D resource preceding the first D2D resource or predetermined information.

13 Claims, 12 Drawing Sheets

(51) Int. Cl.
  *H04W 24/04* (2009.01)
  *H04W 76/14* (2018.01)
  *H04W 72/00* (2009.01)
  *H04W 72/04* (2009.01)
  *H04W 8/00* (2009.01)
  *H04W 88/02* (2009.01)
  *H04W 88/08* (2009.01)

(52) U.S. Cl.
  CPC ..... *H04W 56/0015* (2013.01); *H04W 72/005* (2013.01); *H04W 72/0413* (2013.01); *H04W 72/0446* (2013.01); *H04W 76/10* (2018.02); *H04W 76/14* (2018.02); *H04W 88/02* (2013.01); *H04W 88/08* (2013.01)

(56) References Cited

FOREIGN PATENT DOCUMENTS

| CN | 104105155 A | 10/2014 |
|---|---|---|
| JP | WO2016/159007 A1 | 10/2016 |
| KR | 10-2013-0035964 A | 4/2013 |
| WO | 2013/002688 A1 | 1/2013 |
| WO | 2013/091229 A1 | 6/2013 |
| WO | 2014/168571 A2 | 10/2014 |
| WO | WO 2014/163410 A1 | 10/2014 |
| WO | WO 2014/177091 A1 | 11/2014 |
| WO | WO 2014/180429 A1 | 11/2014 |

OTHER PUBLICATIONS

LG Electronics, "Details of D2DSS Design", 3GPP TSG RAN WG1 Meeting #79, R1-144877, San Francisco, USA, Nov. 17-21, 2014, pp. 1-6.

LG Electronics, "Measurement for D2D Synchronization", 3GPP TSG RAN WG1 Meeting #79, R1-144882, San Francisco, USA, Nov. 17-21, 2014, pp. 1-3.

Qualcomm Incorporated, "Status Report to TSG 1 Work Plan Related Evaluation", 3GPP TSG RAN Meeting #66, RP-141894, Maui, USA, Dec. 8-11, 2014, pp. 1-38.

CATT, "D2D synchronization procedure in partial and out-of-coverage scenario," 3GPP TSG RAN WG1 Meeting #79, R1-144610, San Francisco, USA, Nov. 17-21, 2014, 3 pages.

NEC, "D2D synchronization procedure for out-of-network coverage," 3GPP TSG RAN WG1 Meeting #78bis, R1-143928, Ljubljana, Slovenia, Oct. 6-10, 2014, 4 pages.

Ericsson, "Transmitter Behaviour for D2D Synchronization," 3GPP TSG RAN WG1 Meeting #78bis, R1-144322, Ljubaljana, Slovenia, Oct. 6-10, 2014, 7 pages.

* cited by examiner

FIG. 5
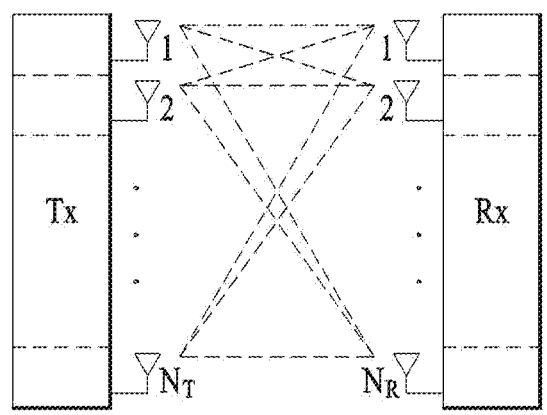
(a)
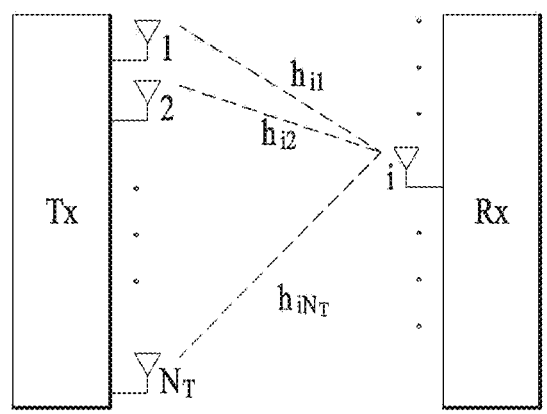
(b)

METHOD FOR PERFORMING DEVICE TO DEVICE COMMUNICATION IN WIRELESS COMMUNICATION SYSTEM AND DEVICE PERFORMING SAME

CROSS REFERENCE TO RELATED APPLICATIONS

This application is the National Phase of PCT International Application No. PCT/KR2015/013075, filed on Dec. 3, 2015, which claims priority under 35 U.S.C. 119(e) to U.S. Provisional Application No. 62/089,212, filed on Dec. 8, 2014, all of which are hereby expressly incorporated by reference into the present application.

TECHNICAL FIELD

The present invention relates to a wireless communication system, and more particularly, to a method for terminals supporting D2D (device to device) communication to receive or transmit a signal.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

DISCLOSURE OF THE INVENTION

Technical Task

A technical task of the present invention is to provide a method for a D2D terminal to perform a D2D operation when the D2D terminal performing the D2D operation fails to receive at least a part of signals from a synchronization reference node of the D2D terminal.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting a device-to-device (D2D) broadcasting channel, which is transmitted by a D2D user equipment (UE) supporting a D2D operation, includes decoding a region of a first D2D resource in which a first D2D synchronization signal and a first D2D broadcasting channel are transmitted from a synchronization reference source of the D2D UE, and transmitting a second D2D synchronization signal and a second D2D broadcasting channel of the D2D UE in a second D2D resource according to a result of the decoding. In this case, when the D2D UE fails to obtain system information included in the first D2D broadcasting channel by the decoding, the second D2D broadcasting channel is configured using system information obtained from a previous D2D resource preceding the first D2D resource or predetermined information.

To further achieve these and other advantages and in accordance with the purpose of the present invention, according to another embodiment, a D2D UE supporting a D2D operation includes a processor configured to decode a region of a first D2D resource in which a first D2D synchronization signal and a first D2D broadcasting channel are transmitted from a synchronization reference source of the D2D UE, and a transmitter configured to transmit a second D2D synchronization signal and a second D2D broadcasting channel of the D2D UE in a second D2D resource according to a result of the decoding. In this case, if the D2D UE fails to obtain system information included in the first D2D broadcasting channel by the decoding, the second D2D broadcasting channel is configured using system information obtained from a previous D2D resource preceding the first D2D resource or predetermined information.

Preferably, the previous D2D resource preceding the first D2D resource may correspond to a most recently successfully decoded resource within a time window which is configured based on the second D2D resource.

More preferably, an end time of the time window can be configured based on a length of time required for processing a D2D signal received by the D2D UE.

More preferably, a starting time of the time window can be configured based on a time length which is an integer multiple of a transmission periodicity of the first D2D synchronization signal and the first D2D broadcasting channel.

Preferably, when a time length or a count of continuously failing in obtaining the system information included in the first D2D broadcasting channel by the decoding exceeds a threshold, the second D2D synchronization signal and the second D2D broadcasting channel can be configured irrespective of the synchronization reference source.

More preferably, a sequence of the second D2D synchronization signal, which is configured irrespective of the synchronization reference source, can be selected from a predefined set of D2D synchronization signal sequences from which a sequence of the first D2D synchronization signal is excluded.

Preferably, the predetermined information can include a value for indicating that the D2D UE has failed to obtain the system information included in the first D2D broadcasting channel from the synchronization reference source.

Preferably, the system information obtained from the previous D2D resource is used until a time length or a count of continuously failing in obtaining the system information included in the first D2D broadcasting channel is smaller than a threshold and the predetermined information can be used for the second D2D broadcasting channel when the time length or the count of continuously failing in obtaining the system information included in the first D2D broadcasting channel is equal to or greater than the threshold.

Preferably, if it succeeds in obtaining the system information of the first D2D broadcasting channel by the decoding, remaining contents of system information of the second D2D broadcasting channel except for a D2D resource index and an in-coverage indicator and the first D2D broadcasting channel are identically configured as the first D2D broadcasting channel and the D2D resource index and the in-coverage indicator can be configured on a basis of the D2D UE.

Advantageous Effects

According to one embodiment of the resent invention, although a D2D terminal performing a D2D operation on the basis of a synchronization of a different node fails to receive a signal from a synchronization reference node of the D2D terminal, the D2D terminal can continuously perform the D2D operation of the D2D terminal. Moreover, although the D2D terminal selects the synchronization reference node on the basis of reception signal power, a signal reception failure due to interference or noise can be more flexibly processed.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention, illustrate embodiments of the invention and together with the description serve to explain the principle of the invention.

FIG. 5 is a diagram showing the configuration of a wireless communication system having multiple antennas.

BEST MODE

Mode for Invention

Figure 1:
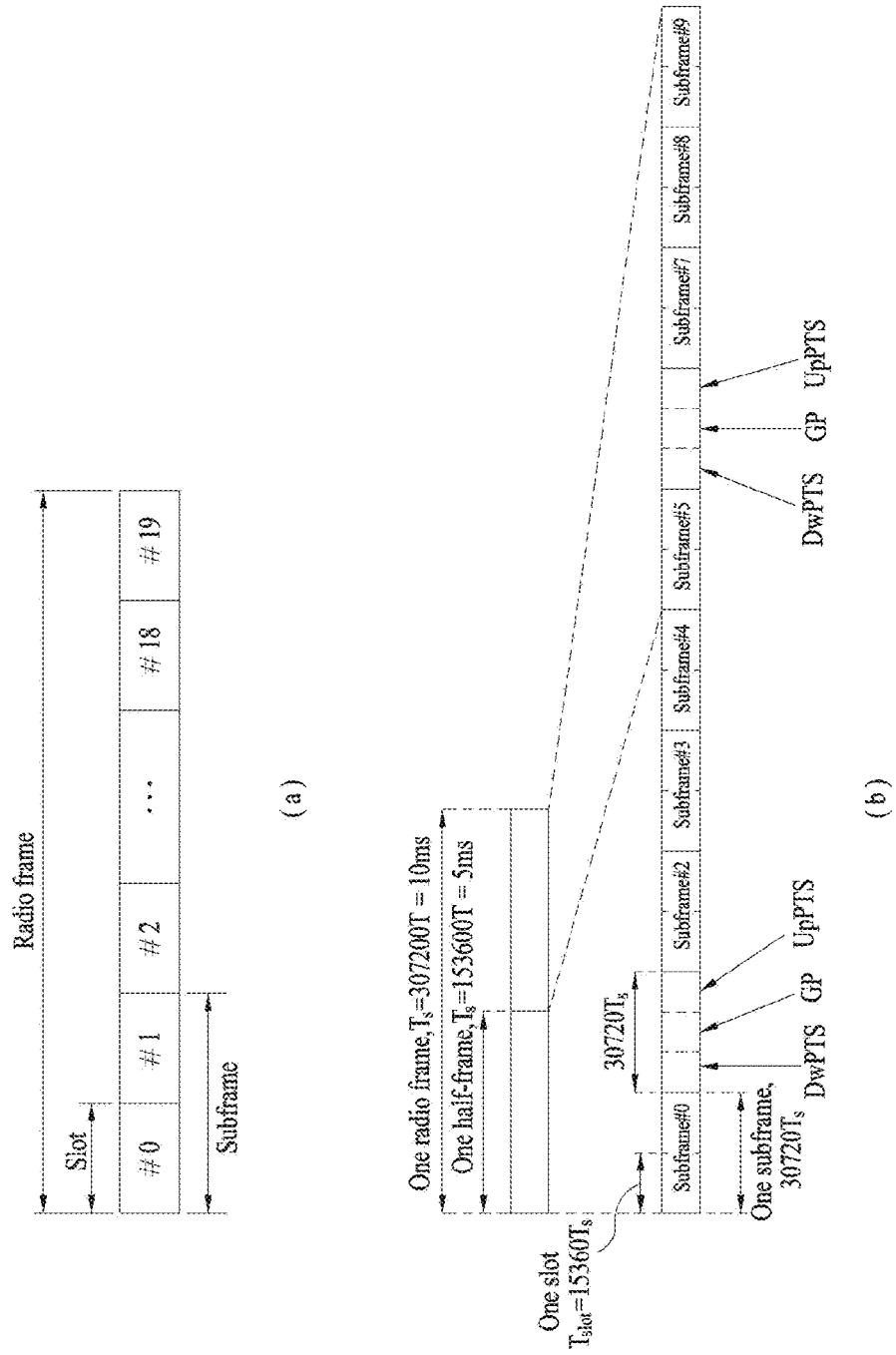
FIG. 1 is a diagram showing the structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
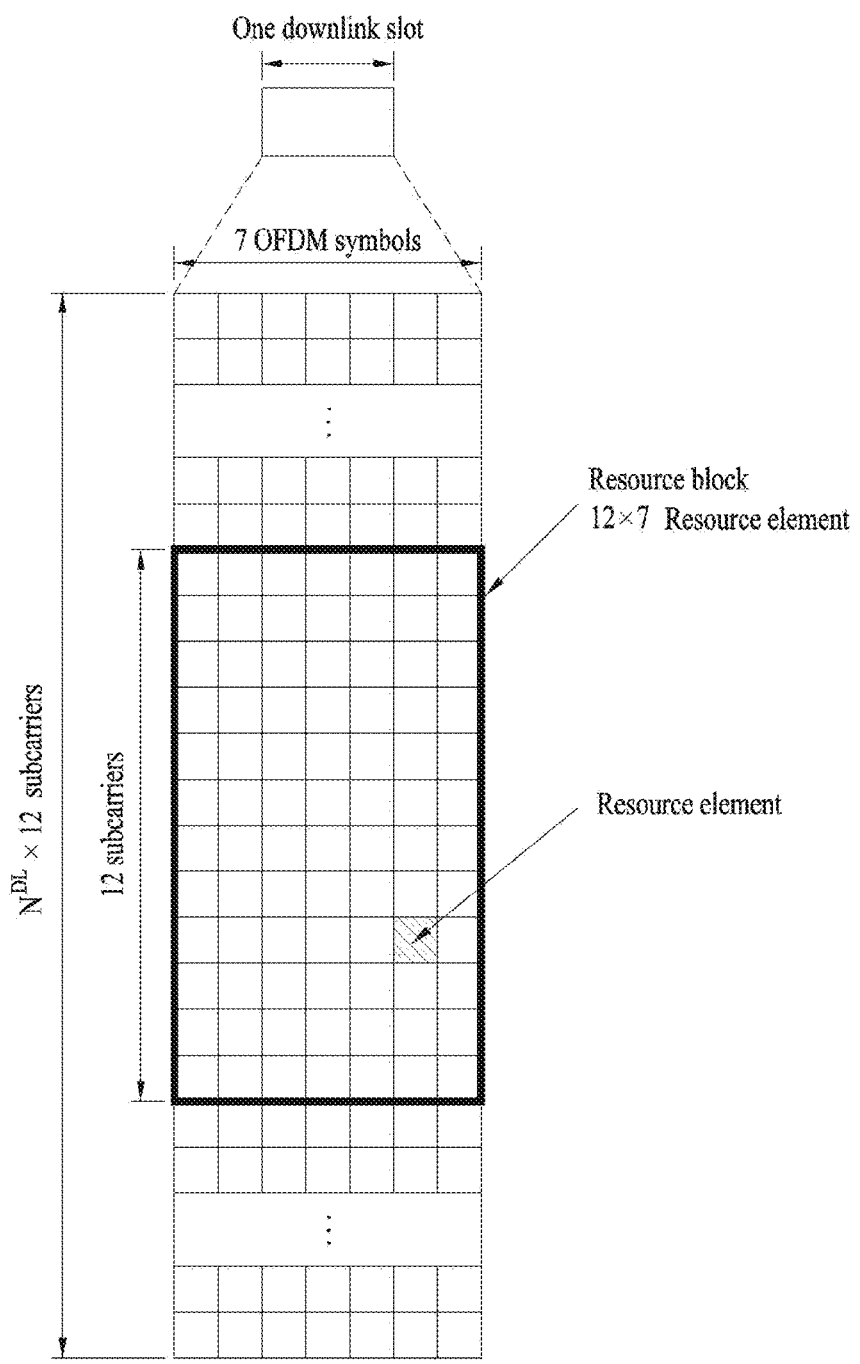
FIG. 2 is a diagram showing a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
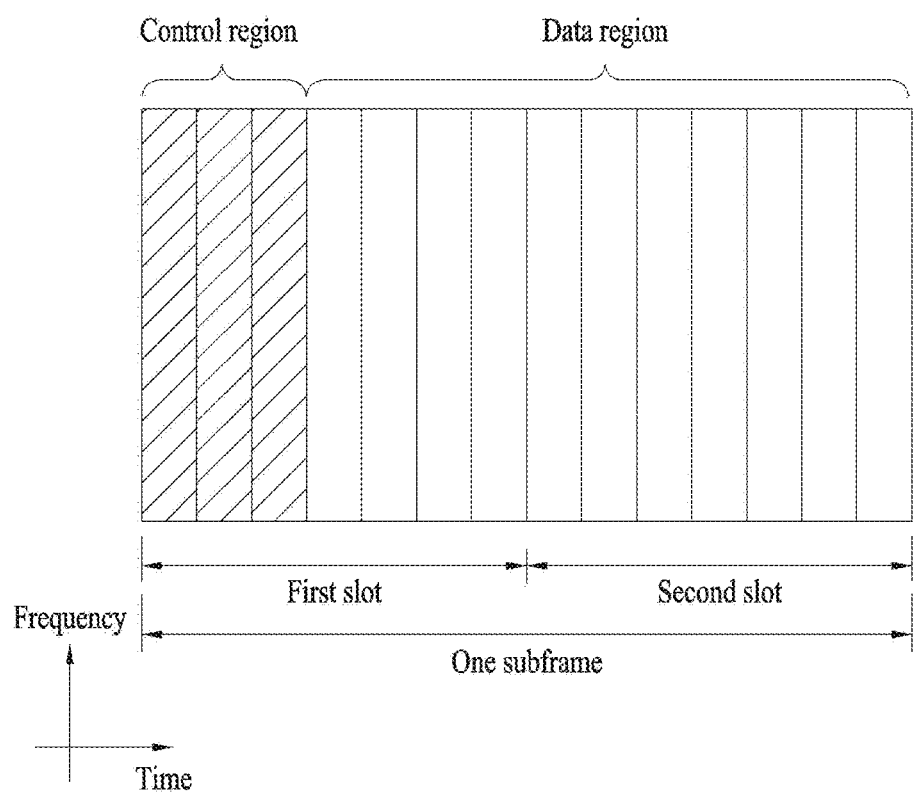
FIG. 3 is a diagram showing the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
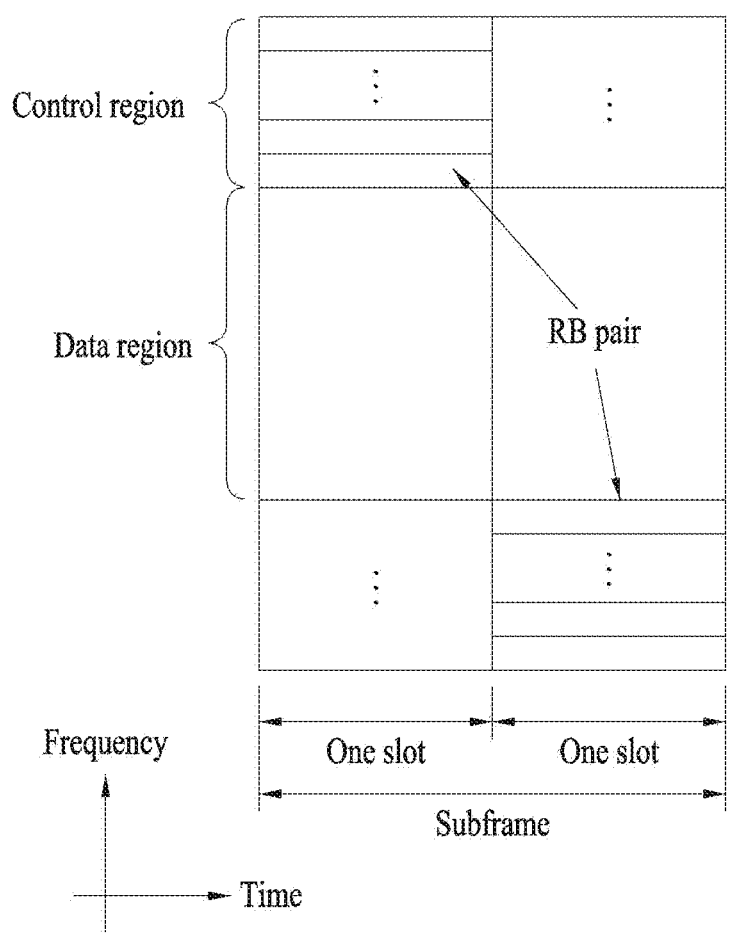
FIG. 4 is a diagram showing the structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO system

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s}=[\hat{s}_1,\hat{s}_2,\ldots,\hat{s}_{N_T}]^T=[P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, s_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $W_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y=[y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the NR receive antennas can be expressed as follows.

$$n=[n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank (H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In this description, "rank" for MIMO transmission refers to the number of paths capable of independently transmitting a signal at a specific time and using specific frequency resources and the "number of layers" refers to the number of signal streams transmitted through each path. In general, since a transmission end transmits layers corresponding in number to the number of ranks used for signal transmission, the rank has the same meaning as the number of layers unless stated otherwise.

PSS (Primary Synchronous Signal)/SSS(Secondary Synchronous Signal)

Figure 6:
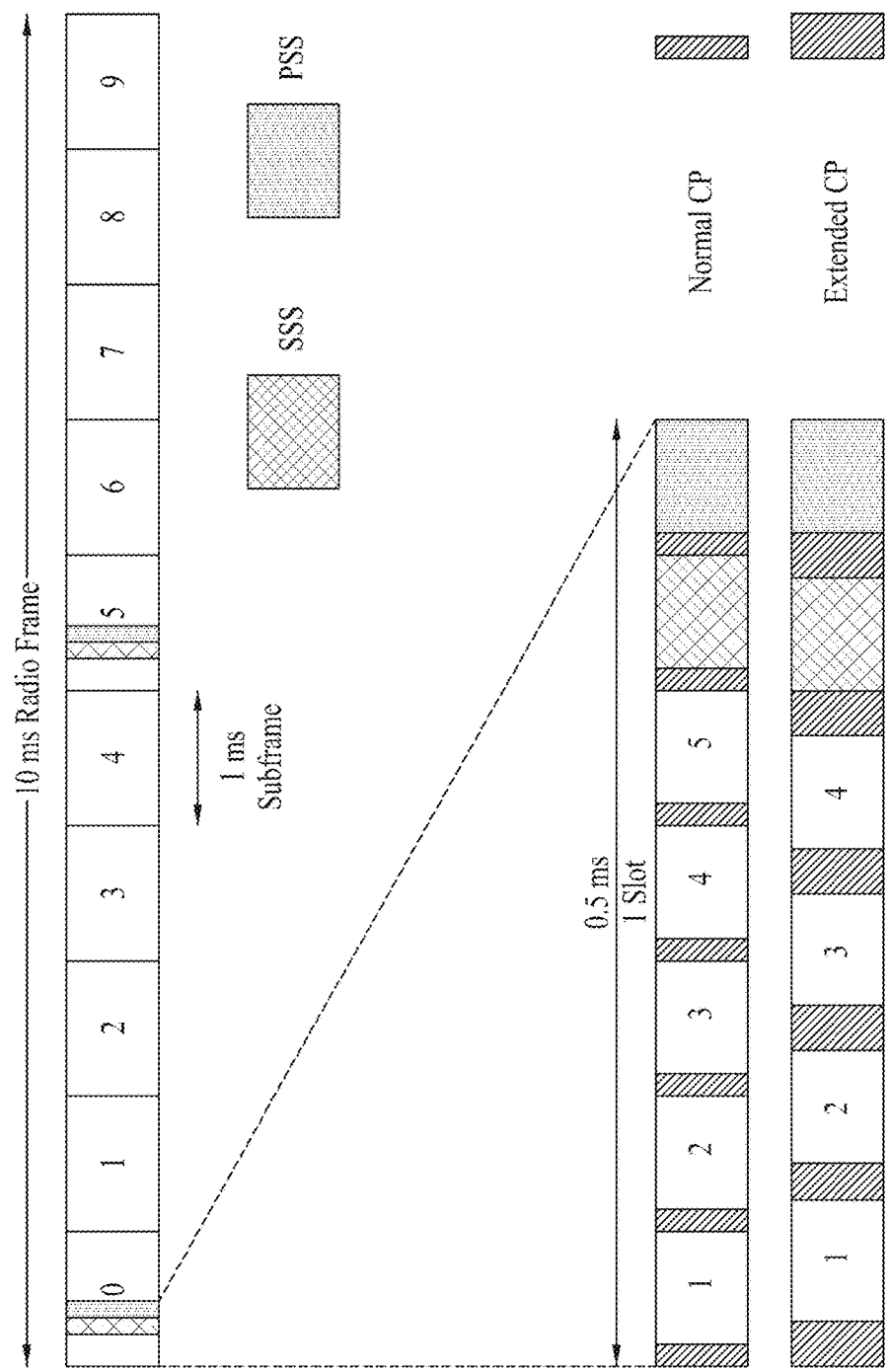
FIG. 6 is a diagram of PSS and SSS of a 3GPP system.

FIG. 6 is a diagram for explaining a PSS and an SSS corresponding to synchronization signals used for a cell search in LTE/LTE-A system. Before the PSS and the SSS are explained, a cell search is explained. When a user equipment initially accesses a cell, the cell search is performed for a case of performing a handover from the currently accessed cell to a different cell, a case of reselecting a cell or the like. The cell search may include acquisition of frequency and symbol synchronization for a cell, acquisition of downlink frame synchronization for a cell and determination of a cell identifier (ID). One cell group consists of three cell identifiers and there may exist 168 cell groups.

An eNB transmits a PSS and an SSS to perform a cell search. A user equipments obtains 5 ms timing of a cell by detecting the PSS and may be able to know a cell identifier included in a cell group. And, the user equipment is able to know radio frame timing and a cell group by detecting the SSS.

Referring to FIG. 6, a PSS is transmitted in a $0^{th}$ and a $5^{th}$ subframe. More specifically, the PSS is transmitted on the last ODFM symbol of a first slot of the $0^{th}$ subframe and the last OFDM symbol of a first slot of the $5^{th}$ subframe, respectively. And, the SSS is transmitted on the last but one OFDM symbol of the first slot of the $0^{th}$ subframe and the last but one OFDM symbol of the first slot of the $5^{th}$ subframe, respectively. In particular, the SSS is transmitted on an OFDM symbol right before an OFDM symbol on which the PSS is transmitted. The aforementioned transmission timing corresponds to a FDD case. In case of TDD, the PSS is transmitted on a third symbol of the $1^{st}$ subframe and a third symbol of a $6^{th}$ subframe (i.e., DwPTS) and the SSS is transmitted on the last symbol of a $0^{th}$ subframe and the last symbol of a $5^{th}$ subframe. In particular, the SSS is transmitted on a symbol preceding as many as 3 symbols of a symbol on which the PSS is transmitted in the TDD.

The PSS corresponds to a Zadoff-Chu sequence of a length of 63. The PSS is actually transmitted on 73 center subcarriers (72 subcarriers except a DC subcarrier, i.e., 6 RBs) of a system frequency bandwidth in a manner that 0 is padding to both ends of the sequence. The SSS consists of a sequence of a length of 62 in a manner that two sequences each of which has a length of 31 are frequency-interleaved. Similar to the PSS, the SSS is transmitted on the center 72 subcarriers of the whole system bandwidth.

PBCH (Physical Broadcast Channel)

Figure 7:
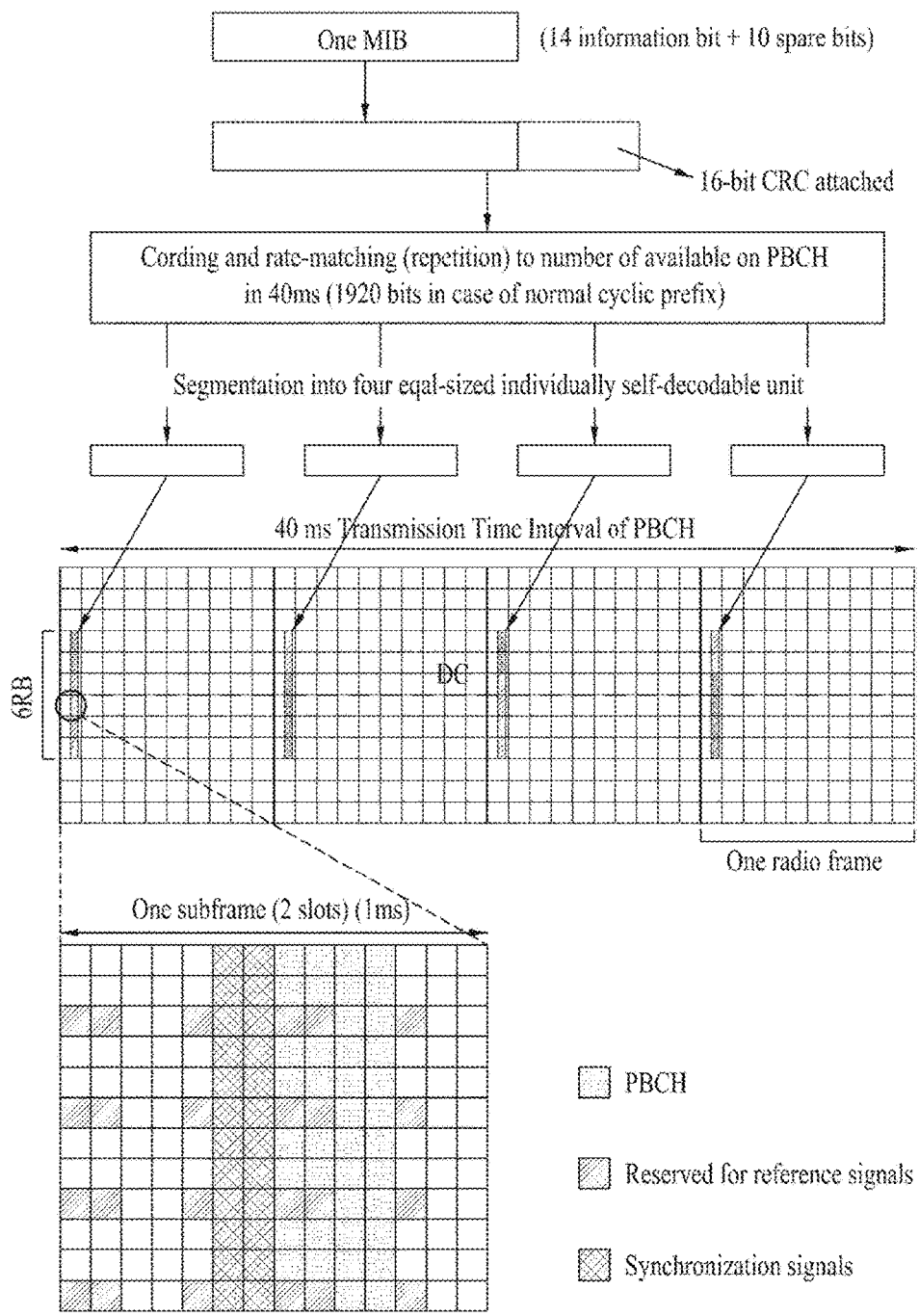
FIG. 7 is a diagram of PBCH of a 3GPP system.

FIG. 7 is a diagram for explaining PBCH. The PBCH corresponds to a channel on which system information corresponding to a master information block (MIB) is transmitted. The PBCH is used to obtain system information after a user equipment obtains synchronization and a cell identifier via the aforementioned PSS/SSS. In this case, downlink cell bandwidth information, PHICH configuration information, a subframe number (a system frame number (SFN)) and the like can be included in the MIB.

As shown in FIG. 7, one MIB transport block is transmitted via a first subframe in each of 4 consecutive radio frames. More specifically, PBCH is transmitted on first 4 OFDM symbols of a second slot of a $0^{th}$ subframe in the 4 consecutive radio frames. Hence, the PBCH configured to transmit a MIB is transmitted with an interval of 40 ms. The PBCH is transmitted on center 72 subcarriers of a whole bandwidth in frequency axis. The center 72 subcarriers correspond to 6 RBs corresponding to a smallest downlink bandwidth. This is intended to make a user equipment decode BCH without any problem although the user equipment does not know a size of the whole system bandwidth.

Initial Access Procedure

Figure 8:
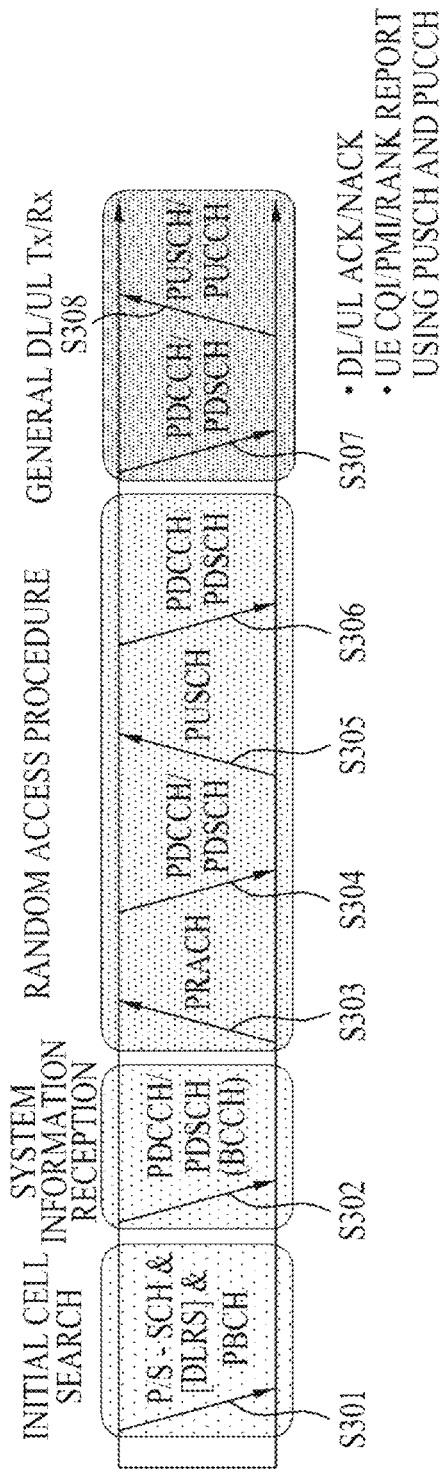
FIG. 8 is a diagram to describe an initial access procedure and signal transceiving method of a 3GPP system.

FIG. 8 is a diagram to describe an initial access procedure and signal transceiving method of a 3GPP system.

If a power of a UE is turned on or the UE newly enters a cell, the UE performs an initial cell search for matching synchronization with a base station and the like [S301]. To this end, the UE receives PSS and SSS from the base station, matches synchronization with the base station and then obtains information such as a cell ID and the like. Subsequently, the UE receives PBCH (physical broadcast channel) from the base station and is then able to obtain intra-cell broadcast information. Meanwhile, the UE receives a downlink reference signal (DL RS) in the initial cell searching step and is then able to check a downlink channel status.

Having completed the initial cell search, the UE receives a physical downlink control channel (PDCCH) and a physical downlink shared control channel (PDSCH) according to information carried on the physical downlink control channel (PDCCH) and is then able to obtain system information in further detail [S302].

Meanwhile, if the UE initially accesses the base station or fails to have a radio resource for signal transmission, the UE may perform a random access procedure (RACH) on the base station [steps S303 to S306]. To this end, the UE transmits a specific sequence as a preamble via a physical random access channel (PRACH) [S303, S305] and is then able to receive a response message via PDCCH and a corresponding PDSCH in response to the preamble [S304, S306]. In case of contention based RACH, a contention resolution procedure may be performed in addition.

Having performed the above mentioned procedures, the UE may perform PDCCH/PDSCH reception [S307] and PUSCH/PUCCH (physical uplink shared channel/physical uplink control channel) transmission [S308] as a general uplink/downlink signal transmission procedure. In particular, the UE receives a downlink control information (DCI) via PDCCH. In this case, the DCI includes such control information as resource allocation information on a UE and may differ in format in accordance with the purpose of its use.

Meanwhile, control informations transmitted to or received from the base station by the UE include DL/UL ACK/NACK signal, CQI (channel quality indicator), PMI (precoding matrix index), RI (rank indicator) and the like. In case of the 3GPP LTE system, the UE may transmit the above-mentioned control informations such as CQI, PMI, RI and the like via PUSCH and/or PUCCH.

D2D Synchronization

In the following, synchronization acquisition between D2D UEs in a D2D (device to device) operation is explained based on the aforementioned description and a legacy LTE/LTE0A system. The D2D operation can include a D2D communication operation, a D2D synchronization operation, and a D2D discovery operation, and the like. Such a term as 'D2D' may be substituted with or used interchangeably with a term 'sidelink'. A D2D UE means a UE supportive of D2D. A UE may mean a D2D UE unless legacy UE is mentioned specially.

1. D2DSS

A D2DSS (D2D synchronization signal) can include a PD2DSS (primary D2DSS) and an SD2DSS (secondary D2DSS). Such a term as 'PD2DSS' may be substituted with or used interchangeably with a term 'PSSS (primary sidelink synchronization signal)' and such as term as 'SD2DSS' may be substituted with or used interchangeably with a term 'SSSS (secondary sidelink synchronization signal)'.

A D2D operation is configured based on LTE/LTE-A system and PD2DSS and SD2DSS can be generated based on a PSS/SSS of the LTE/LTE-A. For example, the PD2DSS may correspond to a Zadoff-Chu sequence or a similar/modified/repeated structure of the PSS. The SD2DSS may correspond to an M-sequence or a similar/modified/repeated structure of the SSS. More specifically, equation 12 for generating a PSS sequence of LTE can be reused to generate a PD2DSS.

[Equation 12]

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases}$$

In equation 12, u corresponds to a root index of a Zadoff-Chu sequence.

The root index u of LTE PSS is selected from among {25, 29, and 34} and a physical cell ID (NIDCell) is generated based on the selected value. More specifically, the physical cell ID (NIDCell) is given by 3NID (1)+NID (2). The NID (1) corresponds to a number selected from among 0 to 167 deducted from an SSS sequence and the NID (2) corresponds to a number selected from among 0 to 2 deducted from a PSS sequence. The NID (2)=0, 1, and 2 correspond to root indexes {25, 29, and 34}, respectively.

26 or 37 can be used as a root index of the PD2DSS. The root index 26 is used for in-coverage and the root index 37 can be used for out-of-coverage. And, two SC-FDMA symbols can be allocated to transmit the PD2DSS in a subframe (hereinafter, PD2DSS symbol). For example, in case of a normal CP, SC-FDMA symbols corresponding to indexes 1 and 2 correspond to PD2DSS symbols. In case of an extended CP, SC-FDMA symbols corresponding to indexes 0 and 1 may correspond to PD2DSS symbols. When there exist two PD2DSS symbols in a subframe, PD2DSS sequences mapped to the two PD2DSS symbols are identically configured. It may allocate two symbols for an SD2DSS.

Although a generated sequence of the PSS/SSS of LTE is transmitted in a DL resource, since D2D communication is performed in a UL resource, the PD2DSS/SD2DSS is transmitted in the UL resource.

2. PD2DSCH & PD2DSCH DMRS

A PD2DSCH (physical D2D synchronization channel) may correspond to a broadcasting channel on which system information (e.g., D2D master information block (D2D MIB), which is necessary for a D2D UE to firstly know before a D2D signal is transmitted and received, is transmitted. Such a term as 'PD2DSCH' can also be referred to as 'PSBCH (physical sidelink broadcast channel)'. If a D2DSS is transmitted to perform a D2D synchronization operation, PD2DSCH and PD2DSCH DMRS are transmitted in a subframe in which the D2DSS is transmitted. Yet, if a D2DSS is transmitted to perform a D2D discovery operation, it is not mandatory to transmit the PD2DSCH and the PD2DSCH DMRS together with the D2DSS.

A D2D UE performs time/frequency synchronization via a D2DSS and is able to know a configuration of a synchronization source via a PD2DSCH. The PD2DSCH is mapped to a D2DSS, a DMRS, and a D2DSS subframe except the last symbol. Rate matching is applied to the D2DSS and the DMRS and puncturing is applied to the last symbol.

The system information transmitted via the PD2DSCH, for example, can include a D2D link (e.g., sidelink) system bandwidth, a TDD UL-DL configuration, a D2D frame number (DFN), a D2D subframe number (DSFN), an in-coverage indicator indicating in/out coverage, and reserved bits.

The DFN (D2D frame number) is configured by 14 bits. 10 out of the 14 bits indicate a frame number in a frame unit and the remaining 4 bits are configured as a subframe offset to indicate a subframe position in a frame.

The TDD UL-DL configuration is configured by 3 bits and indicates a TDD UL-DL configuration currently used by a corresponding synchronization source. Yet, in case of an FDD system, this field is configured by 000.

The in-coverage indicator is configured by 1 bit and indicates whether or not a D2D UE transmitting a D2DSS/PD2DSCH belongs to coverage.

The D2D link system bandwidth is configured by 3 bits and indicates a total bandwidth capable of performing D2D.

A size of the reserved bits corresponds to 20 bits. The reserved bits can be used for transmitting other information in the future. A configuration for the reserved bits can be signaled by SIB or may use a predetermined value.

In order to demodulate a PD2DSCH, a D2D DMRS (demodulation RS) can be transmitted together with the PD2DSCH. In order to generate the D2D DMRS, it may apply D2D-specific partial parameters (group hopping, sequence hopping, orthogonal sequence, RS length, number of layers, antenna port, etc.) and the D2D DMRS can be generated by a scheme similar to a scheme of generating a UL DMRS for PUSCH.

3. D2D Synchronization Source

According to a D2D operation, a part of nodes transmits a D2D synchronization signal (hereinafter, D2DSS) and the remaining D2D UEs can transmit and receive a signal by matching a synchronization with the D2D synchronization signal.

A node providing synchronization to a D2D UE is referred to as a synchronization source. The synchronization source may correspond to a different D2D UE (e.g., D2DSS) or an eNB (e.g., in-coverage PSS/SSS), by which the present invention may be non-limited.

The synchronization source can be classified into an ISS (independent synchronization source) and a DSS (dependent synchronization source).

The ISS can transmit a D2DSS, a PD2DSCH, and/or a PD2DSCH DMRS independent of synchronization of a different synchronization source. In a D2D operation, if an appropriate synchronization reference does not exist near a D2D UE of out-of-network, the D2D UE itself becomes the ISS to transmit a D2DSS. Whether to operate as the ISS can be determined according to a measurement result on a D2DSSS. The measurement on the D2DSS can be performed by measuring a PD2DSCH DMRS, which is transmitted together with the D2DSS, instead of directly measuring the D2DSS. For example, it may be able to measure RSRP of the PD2DSCH DMRS in a subframe in which the D2DSS is received. If a measurement value measured on the D2DSS is less than a threshold (e.g., a predetermined threshold or a threshold signaled by an eNB), the D2D UE operates as the ISS. A periodicity and a resource for transmitting D2DSS/PD2DSCH for the ISS can be determined in advance or can be selected from a designated resource pool.

The DSS dependently operates in accordance with synchronization of a different synchronization source (e.g., synchronization reference UE). In this case, the different synchronization source may correspond to an ISS or a different DSS. The DSS can transmit a D2DSS/PD2DSCH of the DSS based on at least one selected from the group consisting of D2DSS timing, a D2DSS sequence, and a PD2DSCH of the different synchronization source.

If a D2D UE does not operate as the ISS (e.g., DSS), the D2D UE transmits a D2DSS sequence and PD2DSCH contents received by the D2D UE in a D2DSS resource in which a D2DSS is not received. In this case, a DFN and an in-coverage indicator included in the PD2DSCH content may change according to a situation of the D2D UE, but the remaining PD2DSCH contents are transmitted as it is. In case of the change of the DFN, the D2D UE deducts a DFN of a resource of a D2DSS transmitted by the D2D UE based on the received DFN. In case of the change of the in-coverage indicator, if the D2D UE receives a PD2DSCH from an in-coverage synchronization source (e.g., a different D2D UE), the D2D UE corresponding to the DSS can transmit the PD2DSCH by changing the in-coverage indicator with a value (e.g., 0) corresponding to out-of-coverage. In other word, although the in-coverage synchronization source transmits the in-coverage indicator configured by a value (e.g., 1) corresponding to the in-coverage, if the D2D UE corresponding to the DSS is located at the out-of-coverage, the D2D UE transmits the in-coverage indicator by changing the indicator with the value (e.g., 0) corresponding to the out-of-coverage.

PD2DSCH Decoding Failure in DSS

As mentioned in the foregoing description, if a measurement result (e.g., RSRP of PD2DSCH DMRS) on a D2DSS is higher than a predefined threshold, a D2D UE can generate and transmit a D2DSS and a PD2DSCH to be transmitted by the D2D UE based on a D2DSS and a PD2DSCH received by the D2D UE (e.g., DSS).

Since the measurement result on the D2DSS is measured by an RSRP scheme, in some cases, it may be difficult to guarantee reception capability of a PD2DSCH (e.g., it may fail to receive a PD2DSCH). For example, when the D2DSS is measured, deterioration of PD2DSCH reception capability due to interference and noise is not considered. As a result, although the measurement result is higher than the threshold, the PD2DSCH reception capability can be deteriorated due to the interference.

Hence, when reception capability of a D2DSS is good and reception capability of a PD2DSCH is not good, it is necessary to define PD2DSCH contents to be transmitted by a D2D UE. In the following, a method of determining the PD2DSCH contents transmitted by the D2D UE in the aforementioned situation is proposed.

1. Embodiment of Transmitting PD2DSCH Contents Based on Most Recently Successfully Decoded PD2DSCH According to one embodiment of the present invention, if a D2D UE fails to decode a PD2DSCH, the D2D UE can configure PD2DSCH contents to be transmitted by the D2D UE based on a most recently successfully decoded PD2DSCH content. Meanwhile, if the decoding on the PD2DSCH fails, it is unable to obtain contents of the PD2DSCH at a higher layer (e.g., RRC layer). Hence, the failure of the PD2DSCH decoding can also be referred to as a failure in receiving the PD2DSCH. Similarly, the success of the PD2DSCH decoding can also be referred to as a success in receiving the PD2DSCH.

If the D2D UE ever have transmitted the PD2DSCH of the D2D UE based on PD2DSCH decoding after the timing at which the PD2DSCH is most recently successfully decoded, the D2D UE can transmit a DFN (or DSFN) included in PD2DSCH contents of the D2D UE by changing the DFN. Additionally, in the present embodiment, the most recently successfully decoded PD2DSCH may correspond to a most recently successfully decoded PD2DSCH prior to a first timing. In this case, the first timing can be configured in consideration of processing time (e.g., 4 ms).

In addition, it may configure a PD2DSCH, which is successfully decoded after a second timing (e.g., a timing prior to N number of synchronization periodicities on the basis of a current timing), to be valid only. This can be comprehended as a PD2DSCH, which is decoded prior to the second timing, is not valid anymore.

For example, the D2D UE sets a specific time window and may be then able to relay PD2DSCH contents, which are successfully decoded in the time window, on the basis of a timing at which PD2DSCH is transmitted by the D2D UE. In this case, a DFN can be updated according to a transmission subframe.

Figure 9:
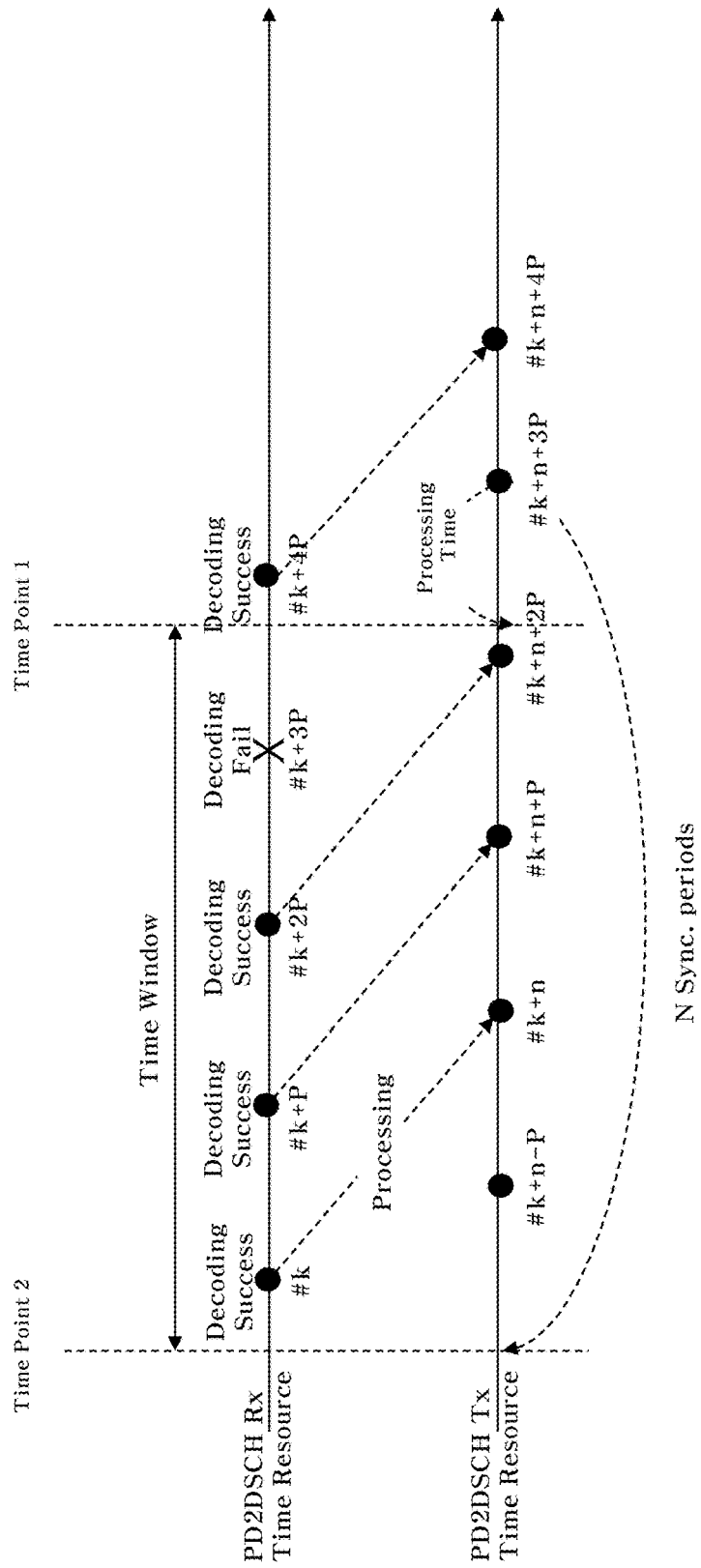
FIG. 9 is a diagram for a time window configuration for receiving PD2DSCH according to one embodiment of the present invention.

FIG. 9 is a diagram for a time window configuration for receiving PD2DSCH according to one embodiment of the present invention. FIG. 9 is illustrated to help the understanding of the present invention. The scope of right of the present invention is not restricted by the drawing.

Referring to FIG. 9, assume that a D2D UE periodically receives a PD2DSCH from a time resource index #k. A time resource index may correspond to a subframe index or a frame index, by which the present invention may be non-limited. Assume that a transmission periodicity of a PD2DSCH, i.e., a D2DSS periodicity, is configured by a 'P' time length. And, if a PD2DSCH is successfully received in a time resource index #k, assume that the D2D UE transmits contents of the PD2DSCH in a time resource index #k+n.

If it fails to decode a PD2DSCH in a time resource index #k+3P, in order for the D2D UE to determine content of the PD2DSCH to be transmitted in a time resource index #k+n+3P, it may use the aforementioned method.

First of all, a first time point can be determined in consideration of minimum processing time. As a result, the first time point is configured prior to a time resource index #k+4P. For example, although a PD2DSCH received in a time resource index #k+4P is successfully decoded, it is unable to transmit a PD2DSCH in a time resource index #k+n+3P based on the PD2DSCH received in the time resource index #k+4P.

A second time point is configured by a prior timing as much as N number of synchronization periodicities from a current timing (#k+n+3P). The N can be configured in advance or can be semi-statically signaled by an eNB. Or, the N may vary depending on a radio channel state.

A most recently successfully decoded PD2DSCH between the first time point and the second time point corresponds to a PD2DSCH received at a time resource index #k+2P. Hence, the D2D UE transmits a PD2DSCH, which is generated based on the PD2DSCH received at the time resource index #k+2P, at the time resource index #k+n+3P.

According to a different embodiment of the present invention, the D2D UE updates a DFN among contents of a PD2DSCH lastly transmitted by the D2D UE (e.g., a PD2DSCH transmitted at the time resource index #k+n+2P in FIG. 9) and then transmits the PD2DSCH at the time resource index #k+n+3P. In the present embodiment, a time window can be similarly configured. In particular, similar to a time window configured for time at which the PD2DSCH is received, it may be able to configure a time window for time at which the PD2DSCH is transmitted.

In the embodiment of determining PD2DSCH contents to be transmitted based on a most recently successfully decoded and received PD2DSCH, as mentioned in the foregoing description, it may be preferable to set a limit on time during which the PD2DSCH contents are valid. If decoding timing of the most recently successfully decoded PD2DSCH is prior to a specific timing, for example, if decoding on the PD2DSCH fails longer than a specific time length or decoding on the PD2DSCH continuously fails more than a specific number, the D2D UE stops transmitting a D2DSS and a PD2DSSCH, reselects a synchronization reference source, or operates as an ISS.

For example, if there is no synchronization source satisfying a condition near the D2D UE, the D2D UE may operate as an ISS. A D2DSS sequence and PD2DSCH contents transmitted by the D2D UE can be determined by predetermined information or can be determined by an autonomous selection of the D2D UE.

If the D2D UE operates as the ISS, the D2D UE excludes a D2DSS sequence forming a pair with a previously successfully decoded PD2DSCH to avoid a collision between D2DSSs. For example, it may be preferable for the D2D UE to select a D2DSS sequence from among remaining sequences from which a D2DSS sequence transmitted by a synchronization source, which is selected by the D2D UE as a timing reference, is excluded.

And, before the D2D UE practically operates as the ISS, a D2DSS sequence, timing, and PD2DSCH contents received from the synchronization source, which is selected by the D2D UE as the timing reference, can be continuously used.

Meanwhile, a condition (e.g., specific time or specific number) necessary for the D2D UE to stop transmitting a PD2DSCH or operate as an ISS can be defined in advance or can be received from an eNB or a different D2D UE (e.g., in-coverage D2D UE).

2. Embodiment of Transmitting Predefined PD2DSCH Contents

According to one embodiment of the present invention, if a measurement result on a D2DSS satisfies a threshold but decoding on a PD2DSCH fails, a D2D UE can transmit predefined PD2DSCH contents at the time of transmitting a PD2DSCH of the D2D UE.

If the predefined PD2DSCH contents are transmitted, it can be comprehended as the D2D UE currently transmitting the PD2DSCH fails to decode a PD2DSCH transmitted from a synchronization source.

The predefined PD2DSCH contents can be set to a partial field (e.g., reserved bit field) only. On the contrary, a predefined value can be set to all PD2DSCH contents. The predefined value may correspond a value configured to be used only when PD2DSCH decoding fails, by which the present invention may be non-limited.

Having received the predefined PD2DSCH contents, the D2D UE (e.g., a D2D UE1) is able to know that a synchronization source (e.g., D2D UE2) of the D2D UE has failed to decode a PD2DSCH received from an upper hop synchronization source (e.g., a D2D UE3 or an eNB). Hence, the D2D UE (e.g., the D2D UE1) can maintain a D2D operation based on the previously received PD2DSCH contents.

Similar to the embodiment of performing transmission based on a most recently successfully decoded PD2DSCH, if PD2DSCH decoding continuously fails, the D2D UE may stop transmitting a D2DSS/PD2DSCH or may operate as an ISS.

Figure 10:
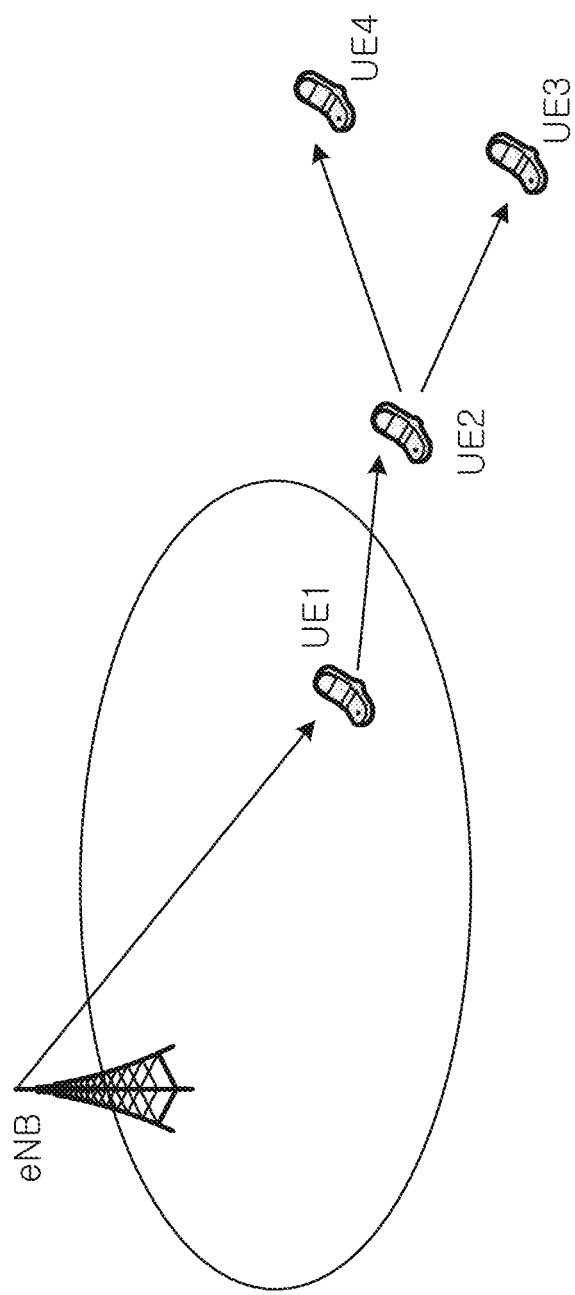
FIG. 10 is a diagram for wireless communication environment according to one embodiment of the present invention.

FIG. 10 is a diagram for wireless communication environment according to one embodiment of the present invention.

Referring to FIG. 10, a UE1 is located at in-network and transmits a D2DSS of the UE1 and a PD2DSCH to a UE2 via a given resource based on PD2DSCH contents received from an eNB.

The UE2 selects the UE1 as a timing reference, changes a DFN and an in-coverage indicator ('1' to '0') only among the D2DSS sequence and the PD2DSCH contents received from the UE1, and transmits the D2DSS sequence and the PD2DSCH contents in a given resource.

A UE3 and a UE4 select the UE2 as a timing reference and may be able to generate and transmit a D2DSS and a PD2DSCH in a given time based on a D2DSS and a PD2DSCH received from the UE2. In this case, the D2DSS and the PD2DSCH transmitted by the UE3 and the UE4 can be generated (based on a root index '36') and transmitted by a sequence indicating out-of-coverage and an SD2DSS can be generated and transmitted by a sequence identical to an SD2DSS received from the UE2.

The UE2 performs measurement on a D2DSS based on a PD2DSCH DMRS transmitted by the UE1. If a measurement result is greater than a predefined threshold, the UE2 generates and transmit a D2DSS/PD2DSCH of the UE2 based on the D2DSS/PD2DSCH transmitted by the UE1. The UE3/UE4 identically performs the aforementioned operation on the D2DSS/PD2DSCH transmitted by the UE2.

Yet, a timing of transmitting the PD2DSCH, an in-coverage indicator, and the like among the contents of the PD2DSCH transmitted by the UE2 and the UE3/UE4 can be transmitted in a manner of being changed. And, the UE2 and the UE3/4 may transmit a PD2SS having a different sequence.

In FIG. 10, if RSRP of the UE1 measured by the UE2 is greater than a threshold, but the UE2 fails to decode the PD2DSCH, the UE2 can transmit the PD2DSCH based on previously successfully decoded PD2DSCH contents or PD2DSCH contents previously transmitted by the UE2.

Yet, if the PD2DSCH decoding continuously fails more than a prescribed time or more than a prescribed number, the UE2 can operate as an ISS. When the UE2 operates as the ISS, the UE2 may use a predetermined D2DSS sequence and/or PD2DSCH contents. For example, the UE2 can select and transmit a D2DSS sequence different from a D2DSS sequence previously used by a synchronization source, which is selected by the UE2 as a timing reference, to avoid a D2DSS collision and the like.

If the UE2 operates as the ISS, the UE2 can inform the UE3/4 that the UE2 is operating as the ISS. Or, the UE2 can inform the UE3/4 that the UE2 is able to use a new D2DSS sequence. These information can be indicated by a PD2DSCH or SA transmitted by the UE2.

As a different method, if the PD2DSCH decoding fails, the UE2 can transmit a PD2DSCH to the UE3/UE4 to indicate that the UE2 has failed to decode the PD2DSCH. Having received the PD2DSCH, the UE3/UE4 operates based on PD2DSCH contents previously received by the UE3/UE4, operates based on the D2DSS/PD2DSCH of the UE2 operating as the ISS (e.g., if the PD2DSCH indicating the PD2DSCH decoding failure is continuously received for more than a prescribed time), performs a synchronization/detection procedure to discover a new synchronization source, or operates as an ISS.

According to a different embodiment of the present invention, if a D2D UE fails to decode a PD2DSCH, the D2D EU generates a part of contents to be transmitted by the D2D UE using a predetermined/predefined value and generates another part of the contents to be transmitted by the D2D UE using a previous PD2DSCH (e.g., a most recently successfully decoded PD2DSCH or a PD2DSCH most recently transmitted by the D2D UE).

D2D Operation Method According to Embodiments of the Present Invention

Figure 11:
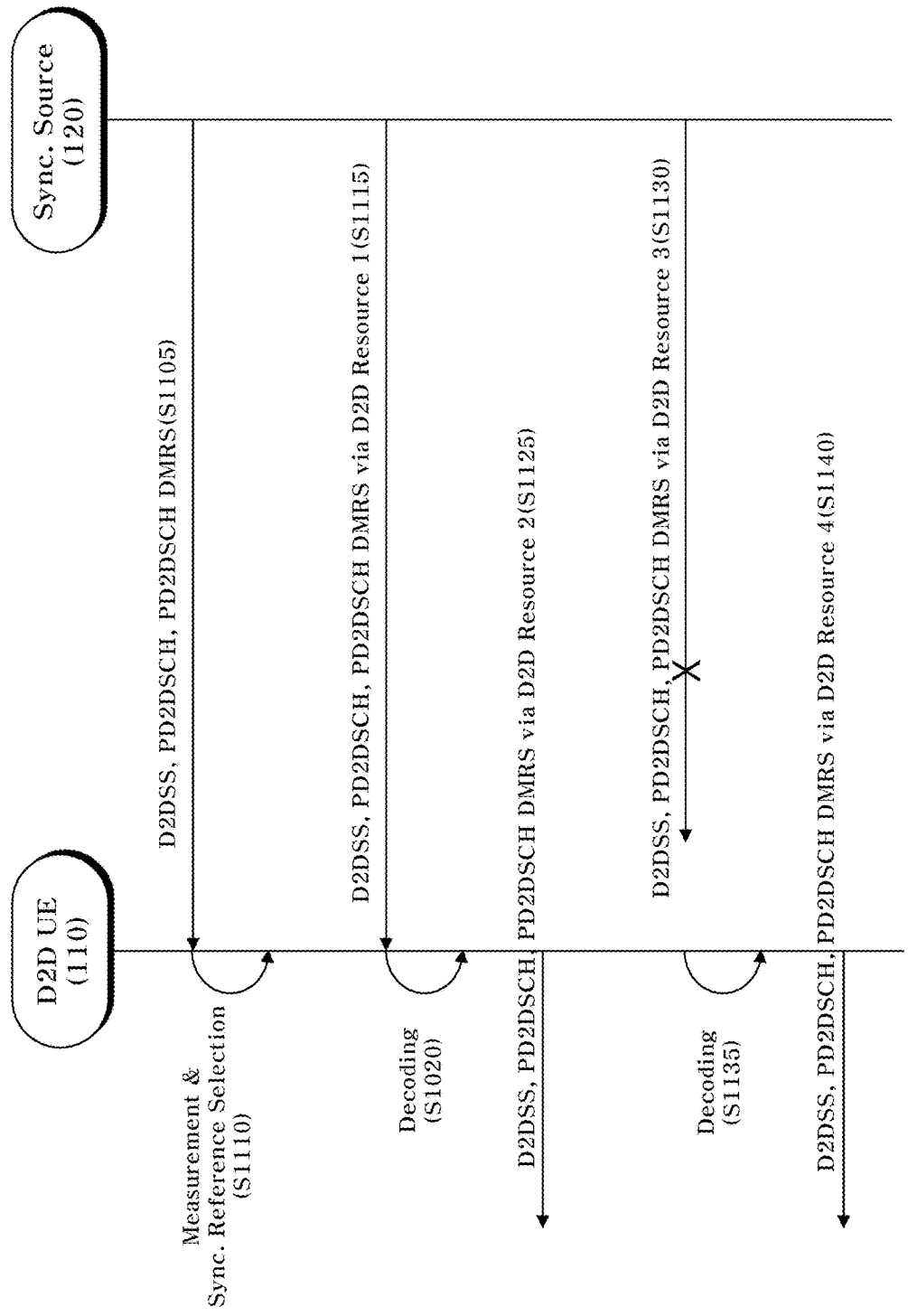
FIG. 11 is a diagram for an operation of a D2D terminal according to one embodiment of the present invention.

FIG. 11 is a diagram for a D2D communication method according to one embodiment of the present invention. Explanation on contents overlapped with the aforementioned contents is omitted.

A synchronization source 120 may corresponds to an ISS or a DSS. If the synchronization source 120 corresponds to the ISS, the synchronization source 120 may correspond to an eNB or another D2D UE. If the synchronization source 120 corresponds to the ISS rather than the eNB, the synchronization source 120 may correspond to a D2D UE located at out-of-coverage.

A D2D UE 110 can be located at the out-of-coverage or in-coverage. If the D2D UE 110 is located at the out-of-coverage, the D2D UE 110 may operate as an ISS.

Referring to FIG. 11, the D2D UE 110 receives a D2DSS, a PD2DSCH, and a PD2DSCH DMRS from the synchronization source 120 [S1105]. As mentioned in the foregoing description, the PD2DSCH corresponds to a D2D broadcasting channel or an SL broadcasting channel and D2D system information (e.g., MIB-SL) can be transmitted via the PD2DSCH. The D2DSS, the PD2DSCH, and the PD2DSCH DMRS can be transmitted in the same subframe.

The D2D UE 110 performs measurement on the D2DSS received from the synchronization source [S1110]. The measurement on the D2DSS may correspond to measurement on RSRP of the PD2DSCH DMRS, which is transmitted together with the D2DSS, instead of directly measuring the D2DSS. For example, if the RSRP of the PD2DSCH exceeds a threshold, the D2D UE 110 can select the synchronization source 120 as a synchronization reference. Meanwhile, the RSRP of the PD2DSCH DMRS exceeding the threshold is a necessary condition for selecting the synchronization source 120 as the synchronization reference. Although the RSRP of the PD2DSCH DMRS exceeds the threshold, it is not mandatory that the synchronization source 120 is selected as the synchronization reference. In the following, for clarity, assume that the synchronization source 120 is selected as the synchronization reference of the D2D UE 110. Hence, the D2D UE 110 can perform a D2D operation on the basis of synchronization timing of the synchronization source 120.

The D2D UE 110 receives a D2DSS, a PD2DSCH, and a PD2DSCH DMRS from the synchronization source 120 via a first D2D resource [S1115].

The D2D UE 110 decodes the PD2DSCH using the received PD2DSCH DMRS [S1020]. In the present step, assume that decoding of the PD2DSCH is successfully performed.

The D2D UE 110 transmits a D2DSS and a PD2DSCH of the D2D UE via a second D2D resource using the D2DSS and the PD2DSCH received from the synchronization source 120 [S1125]. For example, the D2D UE may operate as a DSS. If it succeeds in obtaining system information included in the PD2DSCH by the decoding [S1020], among the system information of the PD2DSCH transmitted by the D2D UE 110, the remaining contents except a D2D resource index and an in-coverage indicator are configured in a manner of being identical to the PD2DSCH received from the synchronization source 120. Yet, among the system information of the PD2DSCH transmitted by the D2D UE 110, the D2D resource index (e.g., DFN) and the in-coverage indicator are configured on the basis of the D2D UE 110.

Meanwhile, the synchronization source 120 periodically transmits a D2DSS, a PD2DSCH, and a PD2DSCH DMRS. For example, the synchronization source 120 transmits the D2DSS, the PD2DSCH, and the PD2DSCH DMRS via a third D2D resource [S1130].

The D2D UE 110 decodes a region of the third D2D resource in which the D2DSS, the PD2DSCH, and the PD2DSCH DMRS are transmitted by the synchronization source 120 [S1135]. In the present decoding step, assume that the decoding of the PD2DSCH has failed.

If the D2D UE 110 fails to obtain the system information included in the PD2DSCH in the decoding step [S1335], the D2D UE configures a PD2DSCH to be transmitted by the D2D UE in a fourth D2D resource using system information obtained in a previous D2D resource preceding the third D2D resource or predetermined information.

Subsequently, the D2D UE 110 transmits a D2DSS, a PD2DSCH, and a PD2DSCH DMRS via the fourth D2D resource [S1140].

Meanwhile, the previous D2D resource preceding the third D2D resource may correspond to a most recently successfully decoded resource in a time window which is configured on the basis of the fourth D2D resource. The final time point of the time window can be configured based on a length of time required for processing a D2D signal received by the D2D UE 110. The starting time point of the time window can be configured based on a time length which is an integer multiple of a transmission periodicity of a D2DSS and a PD2DSCH.

If decoding on the PD2DSCH to obtain system information included in the PD2DSCH continuously fails longer than a threshold or decoding on the PD2DSCH continuously fails more than a threshold, the D2DSS and the PD2DSCh transmitted by the D2D UE 110 can be configured independently of the synchronization source 120 corresponding to the synchronization reference. A sequence of the independently configured D2DSS can be selected from a predefined set of D2D synchronization signal sequences from which sequences of the D2DSS of the synchronization source 120 are excluded.

The predetermined information can include a value indicating that the D2D UE 110 has failed to obtain the system information included in the PD2DSCH from the synchronization source 120.

Meanwhile, the system information obtained from the previous D2D resource can be used until the time length or the number of continuous failures in obtaining the system information included in the PD2DSCH is smaller than the threshold. And, the predetermined information can be used when the time length or the number of continuous failures in obtaining the system information included in the PD2DSCH is equal to or greater than the threshold.

Apparatus According to Embodiments of the Present Invention

Figure 12:
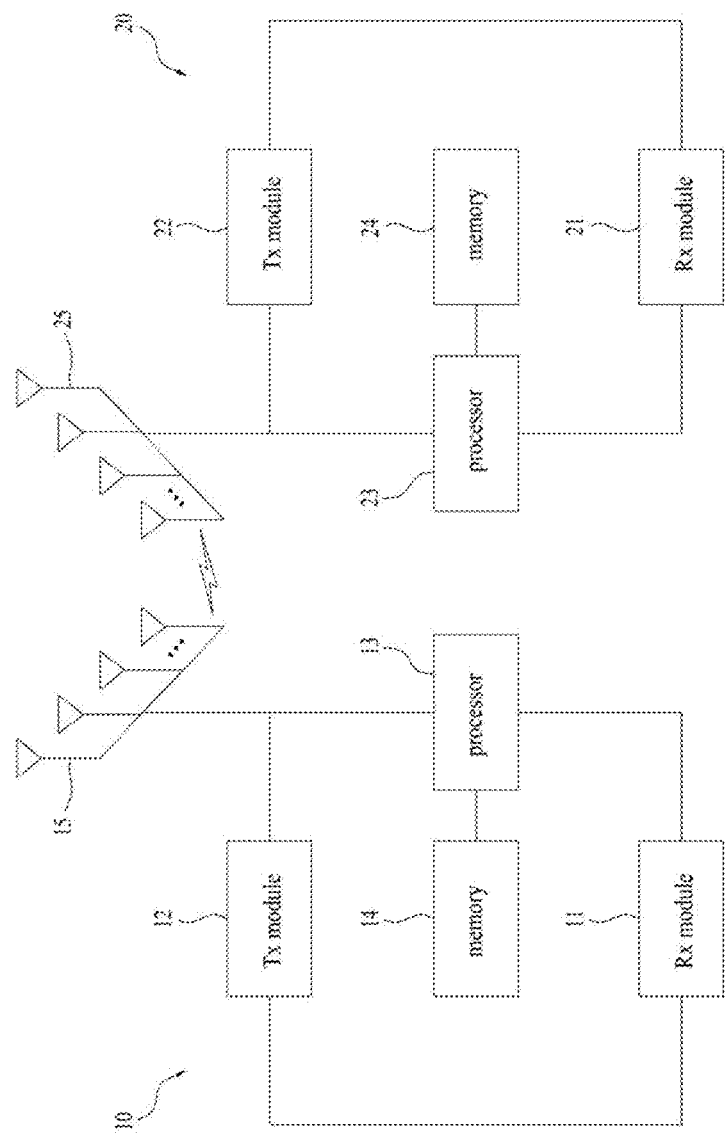
FIG. 12 is a diagram to illustrate a configuration of a transceiving device according to one embodiment of the present invention.

FIG. 12 is a diagram for a transmission point and a reception point according to one embodiment of the present invention. The transmission point and the reception point shown in FIG. 12 can perform the aforementioned embodiments. Explanation on contents overlapped with the aforementioned contents can be omitted.

Depending on an embodiment, the transmission point or the reception point may operate as an eNB, a relay, a D2D UE, a D2D synchronization UE, or a D2D synchronization reference UE, by which the present invention may be non-limited.

Referring to FIG. 12, a transmission point 10 can include a reception module 11, a transmission module 12, a processor 13, a memory 14 and a plurality of antennas 15. A plurality of the antennas 15 correspond to a transmission point supporting MIMO transmission and reception. The reception module 11 can receive various signals, data and information from the user equipment in UL. The transmission module 12 can transmit various signals, data and information to the user equipment in DL. The processor 13 can control overall operation of the transmission point 10.

The processor 13 of the transmission point 10 can process items necessary for each of the aforementioned embodiments.

Besides, the processor 13 of the transmission point 10 performs a function of calculating and processing information received by the transmission point 10, information to be transmitted to the external and the like. The memory 14 can store processed information for prescribed time and can be replaced with such a configuration element as a buffer (not depicted).

Referring to FIG. 12, a reception point 20 can include a reception module 21, a transmission module 22, a processor 23, a memory 24 and a plurality of antennas 25. A plurality of the antennas 25 correspond to a UE supporting MIMO transmission and reception. The reception module 21 can receive various signals, data and information from the base station or a D2D UE in DL. The transmission module 22 can transmit various signals, data and information to the base station or the D2D UE in UL. The processor 23 can control overall operation of the reception point 20.

The processor 23 of the reception point 20 can process items necessary for each of the aforementioned embodiments.

Besides, the processor 23 of the reception point 20 performs a function of calculating and processing information received by the transmission point 10, information to be transmitted to the external and the like. The memory 14 can store processed information for prescribed time and can be replaced with such a configuration element as a buffer (not depicted).

For a concreate configuration of the transmission point and the reception point, items mentioned earlier in various embodiments of the present invention can be independently applied or two or more embodiments can be applied at the same time. For clarity, explanation on contents overlapped with the aforementioned contents is omitted.

And, in explaining FIG. 12, if a relay becomes a downlink transmission entity from the transmission point 10 or an uplink reception entity to the transmission point, or the relay becomes a downlink reception entity from the UE or an uplink transmission entity to the UE, the principle of the present invention can also be identically applied to the relay via various embodiments of the present invention.

The embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Therefore, the present invention is non-limited by the embodiments disclosed herein and intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

As mentioned in the foregoing description, embodiments of the present invention are applicable to various kinds of mobile communication systems.

What is claimed is:

1. A method of transmitting a device-to-device (D2D) broadcasting channel by a D2D user equipment (UE) supporting a D2D operation, the method comprising:
    decoding a region of a first D2D resource in which a first D2D synchronization signal and a first D2D broadcasting channel are transmitted from a synchronization reference source of the D2D UE; and
    transmitting a second D2D synchronization signal and a second D2D broadcasting channel of the D2D UE in a second D2D resource according to a result of the decoding,
    wherein when the D2D UE fails to obtain system information contained in the first D2D broadcasting channel by the decoding, the second D2D broadcasting channel is configured using system information obtained from a previous D2D resource preceding the first D2D resource or predetermined information,
    wherein the previous D2D resource preceding the first D2D resource corresponds to a most recently successfully decoded resource within a time window which is configured based on the second D2D resource, and
    wherein an end time of the time window is configured based on a length of time required for processing a D2D signal received by the D2D UE.

2. The method of claim 1, wherein a starting time of the time window is configured based on a time length which is an integer multiple of a transmission periodicity of the first D2D synchronization signal and the first D2D broadcasting channel.

3. The method of claim 1, wherein when a time length or a count of continuously failing in obtaining the system information contained in the first D2D broadcasting channel by the decoding exceeds a threshold, the second D2D synchronization signal and the second D2D broadcasting channel are configured irrespective of the synchronization reference source.

4. The method of claim 3, wherein a sequence of the second D2D synchronization signal, which is configured irrespective of the synchronization reference source, is selected from a predefined set of D2D synchronization signal sequences from which a sequence of the first D2D synchronization signal is excluded.

5. The method of claim 1, wherein the predetermined information comprises a value for indicating that the D2D UE has failed to obtain the system information contained in the first D2D broadcasting channel from the synchronization reference source.

6. The method of claim 1, wherein the system information obtained from the previous D2D resource is used until a time length or a count of continuously failing in obtaining the system information contained in the first D2D broadcasting channel is smaller than a threshold and
wherein the predetermined information is used for the second D2D broadcasting channel when the time length or the count of continuously failing in obtaining the system information contained in the first D2D broadcasting channel is equal to or greater than the threshold.

7. The method of claim 1, wherein when the D2D UE succeeds in obtaining the system information of the first D2D broadcasting channel by the decoding, remaining contents of system information of the second D2D broadcasting channel except for a D2D resource index and an in-coverage indicator and the first D2D broadcasting channel are identically configured as the first D2D broadcasting channel and wherein the D2D resource index and the in-coverage indicator are configured on a basis of the D2D UE.

8. A device-to-device user equipment (D2D UE) supporting a D2D operation, the D2D UE comprising:
a processor configured to decode a region of a first D2D resource in which a first D2D synchronization signal and a first D2D broadcasting channel are transmitted from a synchronization reference source of the D2D UE; and
a transmitter configured to transmit a second D2D synchronization signal and a second D2D broadcasting channel of the D2D UE in a second D2D resource according to a result of the decoding,
wherein when the D2D UE fails to obtain system information contained in the first D2D broadcasting channel by the decoding, the second D2D broadcasting channel is configured using system information obtained from a previous D2D resource preceding the first D2D resource or predetermined information,
wherein the previous D2D resource preceding the first D2D resource corresponds to a most recently successfully decoded resource within a time window which is configured based on the second D2D resource, and
wherein an end time of the time window is configured based on a length of time required for processing a D2D signal received by the D2D UE.

9. The D2D UE of claim 8, wherein a starting time of the time window is configured based on a time length which is an integer multiple of a transmission periodicity of the first D2D synchronization signal and the first D2D broadcasting channel.

10. The D2D UE of claim 8, wherein when a time length or a count of continuously failing in obtaining the system information contained in the first D2D broadcasting channel by the decoding exceeds a threshold, the second D2D synchronization signal and the second D2D broadcasting channel are configured irrespective of the synchronization reference source.

11. The D2D UE of claim 10, wherein a sequence of the second D2D synchronization signal, which is configured irrespective of the synchronization reference source, is selected from a predefined set of D2D synchronization signal sequences from which a sequence of the first D2D synchronization signal is excluded.

12. The D2D UE of claim 8, wherein the predetermined information comprises a value for indicating that the D2D UE has failed to obtain the system information contained in the first D2D broadcasting channel from the synchronization reference source.

13. The D2D UE of claim 8, wherein the system information obtained from the previous D2D resource is used until a time length or a count of continuously failing in obtaining the system information contained in the first D2D broadcasting channel is smaller than a threshold and
wherein the predetermined information is used for the second D2D broadcasting channel when the time length or the count of continuously failing in obtaining the system information contained in the first D2D broadcasting channel is equal to or greater than the threshold.

* * * * *